US012056977B2

(12) United States Patent
Yukawa et al.

(10) Patent No.: US 12,056,977 B2
(45) Date of Patent: Aug. 6, 2024

(54) MANAGEMENT APPARATUS AND MONEY HANDLING SYSTEM

(71) Applicant: Glory Ltd., Himeji (JP)

(72) Inventors: Atsushi Yukawa, Hyogo (JP); Ryuji Kataoka, Hyogo (JP); Shigeo Namura, Hyogo (JP); Shinya Hirooka, Hyogo (JP); Shota Sakaue, Hyogo (JP)

(73) Assignee: GLORY LTD., Himeji (JP)

( * ) Notice: Subject to any disclaimer, the term of this patent is extended or adjusted under 35 U.S.C. 154(b) by 376 days.

(21) Appl. No.: 17/221,840

(22) Filed: Apr. 5, 2021

(65) Prior Publication Data

US 2021/0327198 A1 Oct. 21, 2021

(30) Foreign Application Priority Data

Apr. 16, 2020 (JP) ................................ 2020-073385

(51) Int. Cl.

| | |
|---|---|
| ***G07D 11/245*** | (2019.01) |
| ***G07D 11/12*** | (2019.01) |
| ***G07D 11/18*** | (2019.01) |
| ***G07D 11/23*** | (2019.01) |
| ***G07D 11/25*** | (2019.01) |

(52) U.S. Cl.

CPC ......... *G07D 11/245* (2019.01); *G07D 11/135* (2019.01); *G07D 11/18* (2019.01); *G07D 11/23* (2019.01); *G07D 11/25* (2019.01)

(58) Field of Classification Search

CPC .... G07D 11/245; G07D 11/135; G07D 11/23; G07D 11/24

See application file for complete search history.

(56) References Cited

FOREIGN PATENT DOCUMENTS

| | | | | |
|---|---|---|---|---|
| JP | 2012164282 A | * | 8/2012 | |
| JP | 5815248 B2 | | 11/2015 | |
| JP | 2016033750 A | * | 3/2016 | |
| JP | 2017130224 A | * | 7/2017 | |
| JP | 2018036833 A | * | 3/2018 | |
| JP | 2019053787 A | * | 4/2019 | |
| JP | 2019117608 A | * | 7/2019 | |

* cited by examiner

*Primary Examiner* — Christle I Marshall
(74) *Attorney, Agent, or Firm* — XSENSUS LLP

(57) ABSTRACT

A money handling system includes a plurality of money handling apparatuses and a management apparatus. Each money handling apparatus includes an operation input device and performs a money depositing process and/or a money dispensing process. The management apparatus includes circuitry configured to determine a first money handling apparatus, in which an operation for requesting replenishment of money has been performed on the operation input device, as a replenishment-destination apparatus; inquire, to other money handling apparatuses of the plurality of money handling apparatuses, about whether or not money is available for dispensing via a replenishment process; determine a second money handling apparatus, in which an operation for accepting the replenishment process has been performed on the operation input device of the second money handling apparatus, as a replenishment-source apparatus; and notify the replenishment-source apparatus and the replenishment-destination apparatus of information of acceptance of the replenishment process by the replenishment-source apparatus.

19 Claims, 6 Drawing Sheets

MANAGEMENT APPARATUS AND MONEY HANDLING SYSTEM

CROSS REFERENCE TO RELATED APPLICATION

The present application is based on and claims priority to Japanese Patent Application No. 2020-073385 filed on Apr. 16, 2020, the entire disclosure of which is incorporated herein by reference.

TECHNICAL FIELD

The present disclosure relates to a management apparatus for managing a plurality of money handling apparatuses, and a money handling system including the management apparatus.

BACKGROUND

Conventionally, a money handling system including a plurality of money handling apparatuses and a management apparatus for managing the respective money handling apparatuses has been used. For example, conventional money handling apparatuses may be referred to as "change machines", and a management apparatus for managing the respective change machines. Each change machine is connected to a POS (Point of Sale) register and installed at a checkout counter in a store. In a transaction with a customer, the change machine performs depositing process of money paid by the customer, and performs dispensing process of change, if any, to be returned to the customer.

The management apparatus monitors the inventory quantity of money stored in each change machine to avoid a situation that the change machine cannot dispense change. When detecting a change machine in which the quantity of money is less than a predetermined quantity, the management apparatus, in order to replenish this change machine with money, determines another change machine from which the money for replenishment can be dispensed. The management apparatus notifies a store clerk of the change machines serving as a source and a destination of the money for replenishment. The management apparatus also notifies the clerk of information on the money for replenishment to be moved between these change machines. In accordance with the determination by the management apparatus, the clerk can dispense the money for replenishment from the change machine determined as the replenishment source and replenish the change machine determined as the replenishment destination with the dispensed money for replenishment.

SUMMARY

An aspect of the present disclosure relates to a money handling system for dispensing money. The money handling system includes a plurality of money handling apparatuses and a management apparatus. Each money handling apparatus includes an operation input device and performs a money depositing process and/or a money dispensing process. The management apparatus includes circuitry configured to determine a first money handling apparatus, in which an operation for requesting replenishment of money has been performed on the operation input device, as a replenishment-destination apparatus; inquire, to other money handling apparatuses of the plurality of money handling apparatuses, about whether or not money is available for dispensing via a replenishment process; determine a second money handling apparatus, in which an operation for accepting the replenishment process has been performed on the operation input device of the second money handling apparatus, as a replenishment-source apparatus; and notify the replenishment-source apparatus and the replenishment-destination apparatus of information of acceptance of the replenishment process by the replenishment-source apparatus.

DETAILED DESCRIPTION OF THE DRAWINGS

There are situations with conventional devices in which replenishment of money cannot be efficiently performed. For example, when there is a line of customers waiting checkout at the checkout counter during busy hours of the store, a change machine of the checkout counter has to be used for the checkout. In this situation, even if the change machine is determined as a replenishment source, money for replenishment cannot be immediately dispensed from the change machine. If a change machine determined as a replenishment destination suspends money handling and waits for replenishment with money, this suspension will continue until the replenishment source change machine dispenses money for replenishment. If the replenishment destination change machine continues money handling while waiting for replenishment with money, this change machine is likely to become incapable of dispensing change before the replenishment source change machine dispenses money for replenishment.

The present disclosure is made in view of the aforementioned problem, as well as other problems of the conventional art, and the present disclosure addresses these issues. A money handling system in accordance with the present disclosure performs a money replenishment process can that be efficiently performed between a plurality of money handling apparatuses, and a management apparatus for managing the respective money handling apparatuses in the money handling system.

Hereinafter, a money handling system according to the present disclosure will be described with reference to the accompanying drawings. The money handling systems can be used in various places including financial facilities and retail stores. In an embodiment of the present disclosure, the money handling system is used in a retail store that sells items to customers. In the present embodiment, the term "money" is used for any of "only banknotes", "only coins", and "both banknotes and coins".

Figure 1:
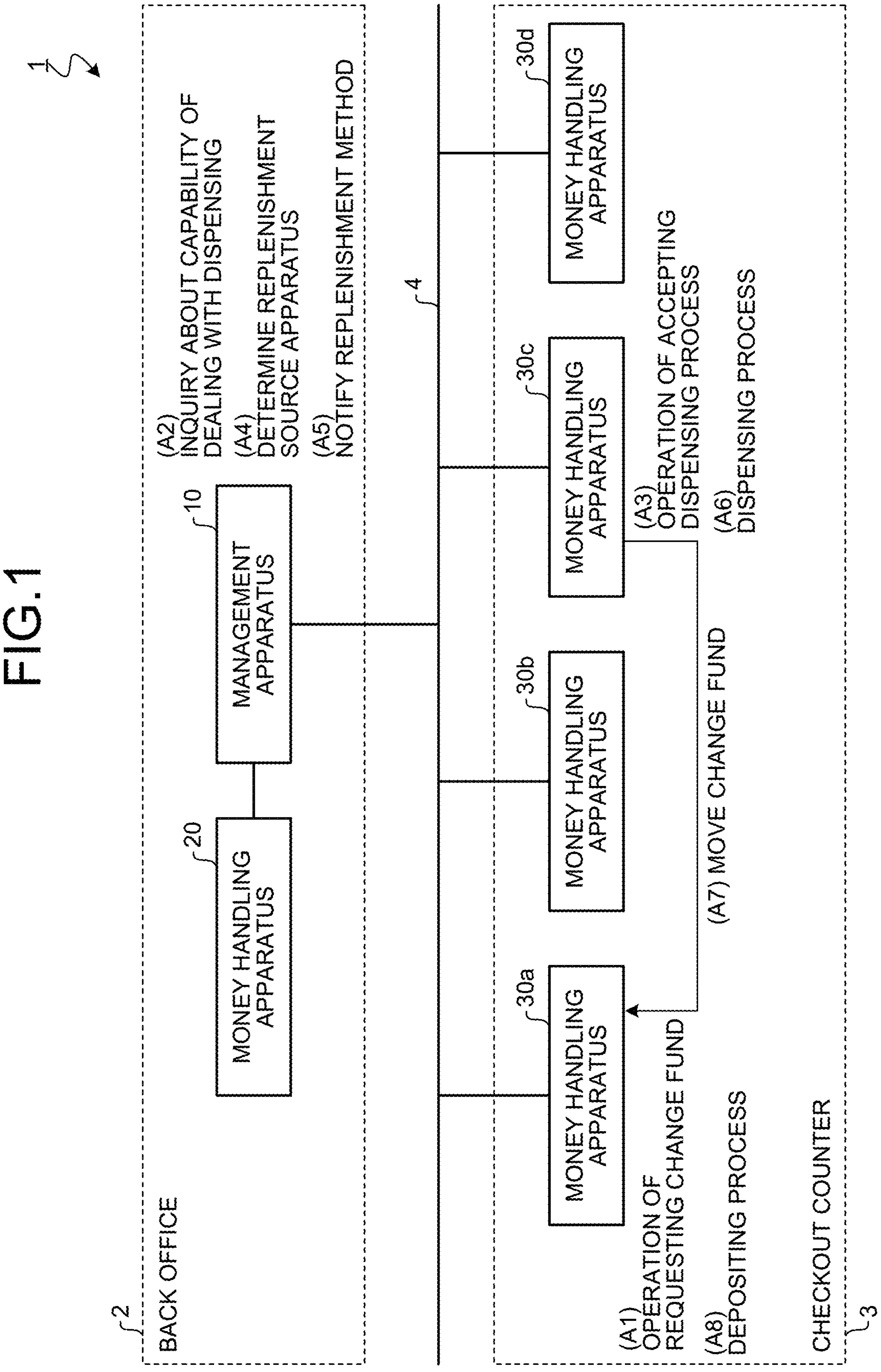
FIG. 1 is a schematic diagram showing an outline of a replenishment process performed in a money handling system.

FIG. 1 is a schematic diagram showing an outline of a replenishment process performed in a money handling system 1. As shown in FIG. 1, the money handling system 1 includes a plurality of money handling apparatuses 20, 30 (30*a* to 30*d*) and a management apparatus 10.

The management apparatus 10 and the money handling apparatus 20 are installed in a back office 2 of the store. For example, the back office 2 is a room where only clerks can enter and customers do not enter. The management apparatus 10 is communicably connected to the money handling apparatus 20. Also, the management apparatus 10 is communicably connected to the money handling apparatuses 30*a* to 30*d* via a network 4. The management apparatus 10 manages inventory information of the money handling apparatuses 20, 30. The inventory information includes denominations of banknotes and the number of banknotes for each denomination stored in each apparatus 20, 30, and denominations of coins and the number of coins for each denomination stored in each apparatus 20, 30. The inventory information is updated each time money handling is performed in the handling apparatuses 20, 30.

The money handling apparatus 20 can perform a banknote depositing process and a banknote dispensing process, and a coin depositing process and a coin dispensing process. For example, before the store is opened, money used as change fund, which is to be stored in each money handling apparatus 30 and used as change returned to customers in transactions with customers, is dispensed from the money handling apparatus 20, and each apparatus 30 is replenished with the dispensed money. During the business hours of the store, if shortage of change fund occurs in a money handling apparatus 30, a clerk can dispense additional change fund from the money handling apparatus 20 and replenish the money handling apparatus 30 with the dispensed change fund. After the store is closed, money collected from each money handling apparatus 30 is deposited in the money handling apparatus 20, for example.

The plurality of money handling apparatuses 30*a* to 30*d* are installed at a checkout counter 3 in the store. That is, the money handling apparatuses 30 are installed in the same area of the store where transactions with customers are performed. Each money handling apparatus 30 includes an operation unit and a display unit. Each money handling apparatus 30 can perform a banknote depositing process and a banknote dispensing process, and a coin depositing process and a coin dispensing process. The money handling apparatus 30 is used for checkout (settlement) of item transactions performed between the store and customers. The respective money handling apparatuses 30*a* to 30*d* are distinguished from each other by register numbers (identification numbers). Each money handling apparatus 30 can be identified by the register number. A clerk is assigned to each register number as a cashier. During the business hours of the store, the cashier uses the money handling apparatus 30 corresponding to the register number assigned to the cashier. The cashier performs a depositing process of money paid by a customer for purchased items and a dispensing process of change to be returned to the customer, by using the money handling apparatus 30. Although four money handling apparatuses 30*a* to 30*d* are shown in FIG. 1, the number of money handling apparatuses 30 is not particularly limited.

In order to avoid shortage of change fund in each money handling apparatus 30 during the business hours of the store, when the quantity of money stored in the money handling apparatus 30 decreases and reaches a preset threshold, a replenishment process of replenishing the money handling apparatus 30 with money is performed. Although the cashier can dispense money from the money handling apparatus 20 in the back office 2 and replenish the money handling apparatus 30 with the dispensed money, it takes time for the cashier to go and come between the checkout counter 3 and the back office 2 located away from the checkout counter 3. Therefore, in the money handling system 1, a money replenishment process can be performed between the plurality of money handling apparatuses 30 installed at the checkout counter 3.

For example, as shown in FIG. 1, when the quantity of money in the money handling apparatus 30*a* decreases and replenishment of change fund is required for this apparatus 30, the cashier in charge of this money handling apparatus 30*a* performs an operation for requesting replenishment (A1). In this operation, the cashier can designate the denomination and quantity of the change fund by using the operation unit of the money handling apparatus 30*a*. In response to this operation, information on the denomination and quantity of the change fund required for the replenishment is notified from the money handling apparatus 30*a* to the management apparatus 10. The method for requesting replenishment of money to the management apparatus 10 may not necessarily be performed manually. The money handling apparatus 30 may automatically perform a process of determining, based on the inventory information thereof, the denomination and quantity of change fund, and notifying the management apparatus 10 of the determined change fund.

Upon receiving the notification, the management apparatus 10 determines the money handling apparatus 30*a* having requested the replenishment of change fund, as a replenishment destination apparatus. Then, in order to determine a money handling apparatus to be a source of change fund (money for replenishment), the management apparatus 10 makes an inquiry to the money handling apparatuses 30*b* to 30*d* except the replenishment destination apparatus 30*a* about whether or not the apparatuses 30*b* to 30*d* can deal with dispensing of the change fund (A2). That is, in the money handling system 1, a process of making an inquiry to each cashier, who is the operator of each money handling apparatus 30, about whether or not he/she can perform a process of dispensing money for replenishment, is performed.

On the display units of the money handling apparatuses 30*b* to 30*d* having received the inquiry, the register number of the money handling apparatus 30*a* is displayed as the replenishment destination apparatus. Also, the denomination and quantity of change fund for replenishing the money handling apparatus 30*a* are displayed. Furthermore, quantity of money, of the same denomination as the change fund, being stored in the apparatus, and information requesting a reply about whether or not the cashier can perform a process of dispensing the change fund, are displayed on each of the display units of the money handling apparatuses 30*b* to 30*d*. Each of the cashiers in charge of the money handling apparatuses 30*b* to 30*d* decides whether or not he/she can perform the dispensing process for the apparatus 30*a*, based on the information displayed on the display unit and the number of customers waiting for the service of the cashier. The cashier of the money handling apparatus 30*c*, who has decided to be able to perform the dispensing process, performs an operation for accepting the dispensing process with the operation unit of the money handling apparatus 30*c* (A3). Upon receiving this operation, the money handling apparatus 30*c* transmits the reply of accepting the dispensing process to the management apparatus 10.

Upon receiving the reply of accepting the dispensing process from the money handling apparatus 30 to which the inquiry was made, the management apparatus 10 determines a money handling apparatus as a replenishment source (A4). The management apparatus 10 determines, as the replenishment source apparatus, the money handling apparatus 30*c* which has firstly transmitted the reply of accepting the dispensing process to the management apparatus 10, for example. After determination of the replenishment source apparatus, the management apparatus 10 notifies the money handling apparatus 30*a*, which is the replenishment destination apparatus, and the money handling apparatus 30*c*, which is the replenishment source apparatus, of the determination result (A5).

On the display unit of the money handling apparatus 30*c* received the determination result from the management apparatus 10, information indicating that the apparatus 30*c* has been determined as the replenishment source apparatus is displayed. The cashier of the money handling apparatus 30*c* checks the display screen, and performs the process of dispensing the change fund for the money handling apparatus 30*a* from the money handling apparatus 30*c* (A6).

On the display unit of the money handling apparatus 30*a* received the determination result from the management apparatus 10, the register number of the money handling apparatus 30*c* determined as the replenishment source apparatus is displayed. The cashier of the money handling apparatus 30*a* checks the display screen, goes to the place where the money handling apparatus 30*c* determined as the replenishment source apparatus is installed, receives the change fund dispensed from the money handling apparatus 30*c*, and returns to the place where the money handling apparatus 30*a* is installed (A7). The cashier performs a depositing process of replenishing the money handling apparatus 30*a* with the change fund dispensed from the money handling apparatus 30*c* (A8).

If the management apparatus 10 cannot receive a reply of accepting the dispensing process when a predetermined time has elapsed after making the inquiry about capability of performing the dispensing process, the management apparatus 10 notifies the money handling apparatus 30*a* to dispense the change fund from the money handling apparatus 20 of the back office 2. The information notified by the management apparatus 10 is displayed on the display unit of the money handling apparatus 30*a*. The cashier of the money handling apparatus 30*a* dispenses money from the money handling apparatus 20 in the back office 2, and replenishes the money handling apparatus 30*a* with the dispensed money. Alternatively, in the money handling system 1, the quantity of the change fund may be divided into a plurality of smaller quantities so that the change fund can be dispensed from a plurality of replenishment source apparatuses to achieve the replenishment process. This will be described later in detail.

In the money handling system 1, after necessity of replenishing the money handling apparatus 30 with money has occurred, the cashier of this money handling apparatus 30, which becomes the money replenishment destination, can perform the operation for requesting replenishment of money at an appropriate timing when the cashier wants to perform the replenishment of money. Also, the cashier of the money handling apparatus 30, which becomes the money replenishment source, can perform the operation for accepting the dispensing process for the replenishment at an appropriate timing when the cashier can deal with the dispensing process. Therefore, the money replenishment process can be efficiently performed between the money handling apparatus 30 as the replenishment source and the money handling apparatus 30 as the replenishment destination, while avoiding the situation that the cashiers cannot deal with the money replenishment process after starting operations for the money replenishment process.

Figure 2:
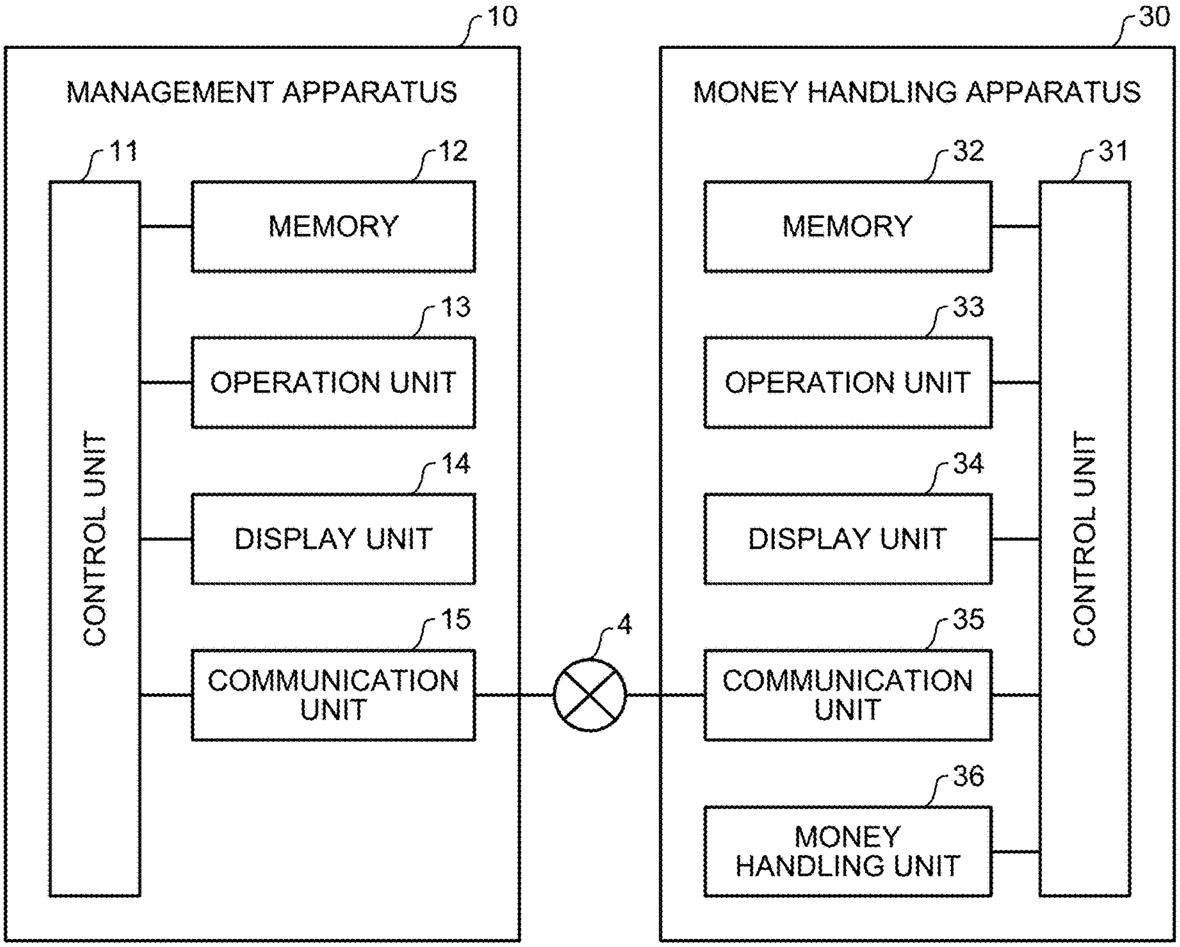
FIG. 2 is a block diagram schematically showing functional configurations of a management apparatus and a money handling apparatus.

The configurations of the management apparatus 10 and the money handling apparatus 30 will be described with reference to FIGS. 2 to 4. FIG. 2 is a block diagram schematically showing the functional configurations of the management apparatus 10 and the money handling apparatus 30. The management apparatus 10 includes a control unit 11, a memory 12, an operation unit 13, a display unit 14, and a communication unit 15. For example, a computer device is used as the management apparatus 10. The operation unit 13 is an operation input device such as a touch screen or keyboard and is used for inputting various kinds of information into the management apparatus 10. The display unit 14 is used for displaying various kinds of information by the management apparatus 10. In an exemplary implementation, the communication unit 15 is a transceiver that transmits/receives information to/from the money handling apparatus 30 via the network 4. The memory 12 is a non-volatile memory device. The memory 12 stores therein various kinds of information used for operations of the management apparatus 10. For example, the memory 12 may store: inventory information of money stored in each of the money handling apparatuses 20, 30; settings for determining whether or not replenishment of a money handling apparatus 30 with money is necessary; settings for determining whether or not collection of money from a money handling apparatus 30 is necessary; and settings for determining a money replenishment method. The control unit 11 controls each component while referring to the information stored in the memory 12, based on an operation performed on the operation unit 13 and/or information received by the communication unit 15, thereby realizing the functions and the operations of the management apparatus 10 described in the present embodiment. A structural configuration of control unit 11 and the other components of management apparatus 10 is described below with respect to FIG. 6.

The money handling apparatus 30 includes a control unit 31, a memory 32, an operation unit 33, a display unit 34, a communication unit 35, and a money handling unit 36. The operation unit 33 is an operation input device such as a touch screen or keyboard and is used for inputting various kinds of information into the money handling apparatus 30. The display unit 34 is used for displaying various kinds of information by the money handling apparatus 30. The communication unit 35 transmits/receives information to/from the management apparatus 10 via the network 4. The memory 32 is a non-volatile memory device. The memory 32 stores therein various kinds of information used for operations of the money handling apparatus 30. For example, the memory 32 may store: inventory information of money stored in the money handling apparatus 30; settings for determining whether or not replenishment of the money handling apparatus 30 with money is necessary; settings for determining whether or not collection of money from the money handling apparatus 30 is necessary; and settings for determining a money replenishment method. The money handling unit 36 performs various types of money handling including a money depositing process and a money dispensing process. The control unit 31 controls each component while referring to the information stored in the memory 32, based on an operation performed on the operation unit 33 and/or information received by the communication unit 35, thereby realizing the functions and the operations of the money handling apparatus 30 described in the present embodiment. A structural configuration of control unit 31 and the other components of money handling apparatus 30 is described below with respect to FIG. 6.

Figure 3:
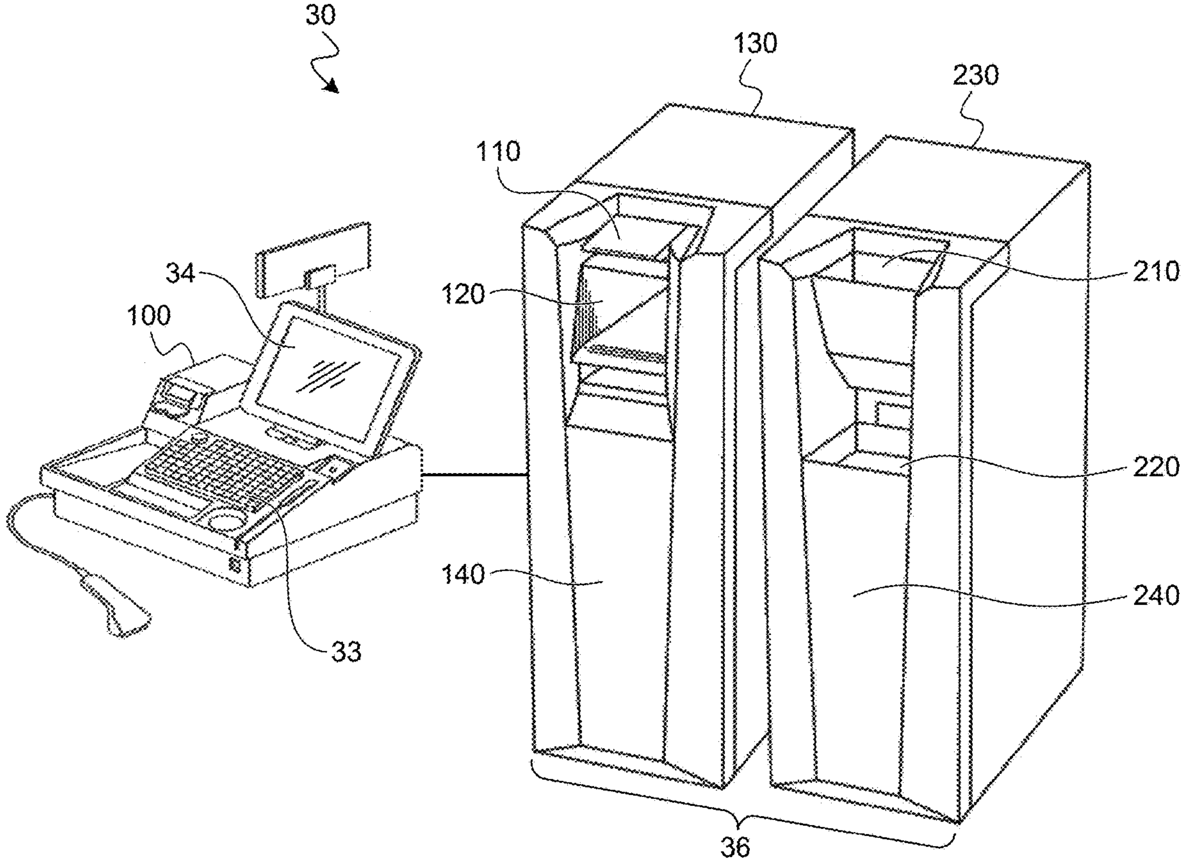
FIG. 3 is an external view of an example of a money handling apparatus.

FIG. 3 is an external view of an example of the money handling apparatus 30. The money handling apparatus 30 shown in FIG. 3 includes a cash register 100, a banknote handling unit 130 and a coin handling unit 230. The cash register 100 includes the operation unit 33 and the display unit 34. The banknote handling unit 130 and the coin handling unit 230 serve as the money handling unit 36.

The banknote handling unit 130 has an inlet 110 from which banknotes are deposited, and an outlet 120 from which banknotes are dispensed. The banknote handling unit 130 has a cover 140 at a front surface thereof. With the cover 140 being opened, a cassette 170 (see FIG. 4A) can be mounted to and dismounted from the unit 130. The coin handling unit 230 has an inlet 210 from which coins are deposited, and an outlet 220 from which coins are dispensed. The coin handling unit 230 has a cover 240 at a front surface thereof. With the cover 240 being opened, a cassette 270 (see FIG. 4B) can be mounted to and dismounted from the unit 230.

The cash register 100 and the money handling unit 36 are communicably connected to each other. In transaction with a customer, a cashier inputs information of items that the customer purchases into the cash register 100, whereby checkout is started. The money handling unit 36 performs a depositing process in which money paid by the customer for the prices of the items is deposited to the unit 36. The money handling unit 36 inputs, into the cash register 100, the amount of deposited money obtained by recognizing and counting the deposited money in the depositing process. The cash register 100 calculates the total amount of the prices of the items that the customer purchases, compares the total amount with the amount of the deposited money received from the money handling unit 36, and instructs the money handling unit 36 to dispense change according to need. Upon receiving the instruction, the money handling unit 36 performs a dispensing process of change. Thus, the checkout is finished.

Figure 4B:
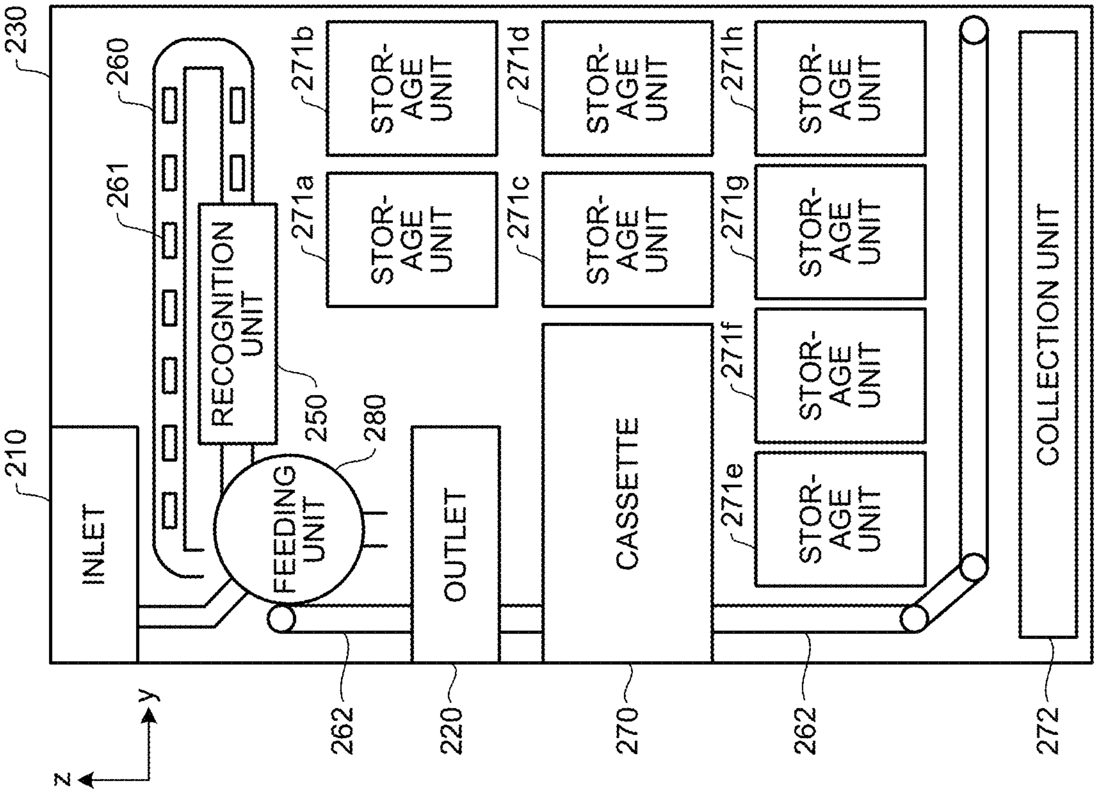
FIG. 4A and FIG. 4B are schematic diagrams showing internal configurations of a banknote handling unit and a coin handling unit.
Figure 4A:
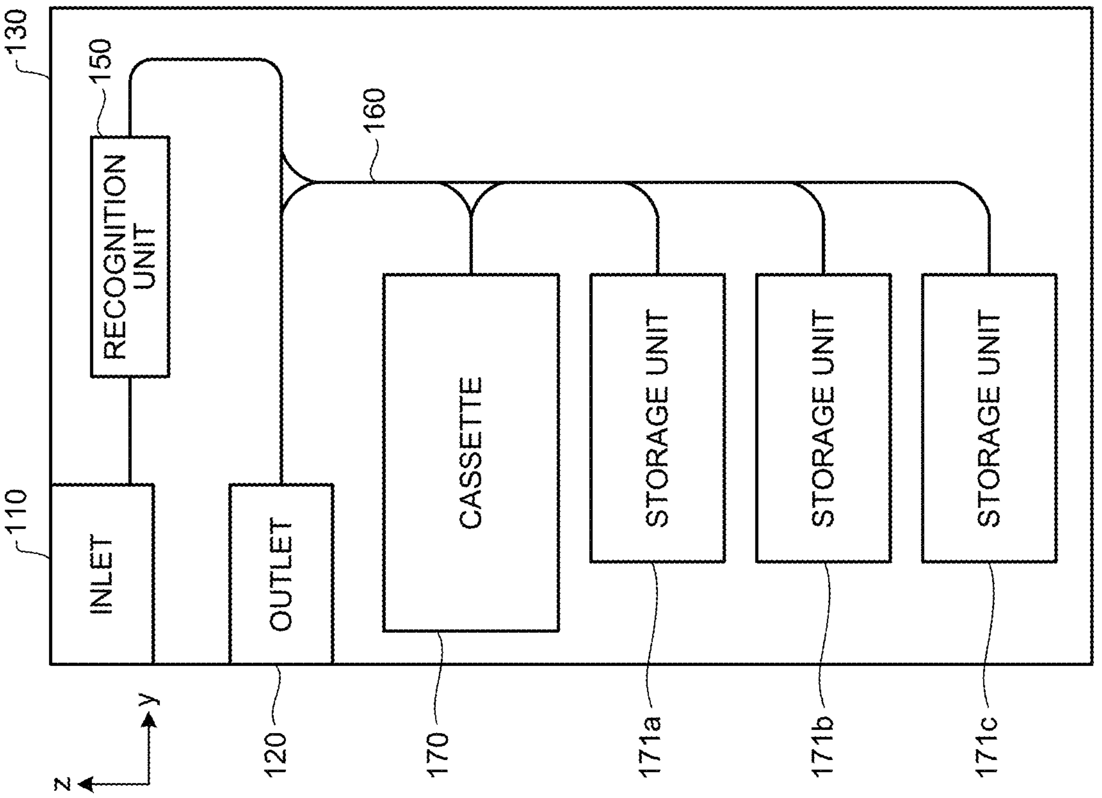

FIGS. 4A and 4B are schematic diagrams showing the internal configurations of the banknote handling unit 130 and the coin handling unit 230, respectively. When the customer pays money at the time of checkout, banknotes are deposited in the banknote handling unit 130 while coins are deposited in the coin handling unit 230. When change needs to be returned to the customer at the time of checkout, banknotes are dispensed from the banknote handling unit 130 while coins are dispensed from the coin handling unit 230.

The banknote handling unit 130 shown in FIG. 4A performs a banknote depositing process and a banknote dispensing process. In the banknote depositing process, banknotes are received by the inlet 110. The received banknotes are fed out into the unit 130 one by one in the inlet 110. The fed out banknotes are transported along a transport path by a transport unit 160. A recognition unit 150 recognizes and counts the banknotes being transported. In an exemplary implementation, recognition unit 150 includes various sensors and circuits in order to perform a recognition process to recognize and count the banknotes. The recognition unit 150 recognizes, for example, denomination, authenticity, and fitness of each banknote. Based on the recognition result, banknotes that cannot be deposited are returned as reject notes from the outlet 120, while banknotes that can be deposited are stored in a plurality of storage units 171*a* to 171*c* for each denomination.

In the banknote dispensing process, banknotes are fed out one by one from the storage units 171 (171*a* to 171*c*). The fed out banknotes are transported along the transport path by the transport unit 160 and are discharged from the outlet 120. The denominations of banknotes to be stored in the respective storage units 171*a* to 171*c* can be set in advance. The money handling apparatus 30 manages the denomination and the number of banknotes being stored in each of the storage units 171*a* to 171*c*. This allows the money handling apparatus 30 to dispense a required number of banknotes of a required denomination from the outlet 120.

Replenishment of a money handling apparatus 30 with banknotes can be performed by using a cassette 170. The cassette 170 is mountable and dismountable with respect to the banknote handling unit 130. A money handling apparatus 30, which is a replenishment source, feeds out banknotes for replenishment from the storage units 171 and stores the banknotes into the cassette 170. The cashier removes the cassette 170, in which the banknotes for replenishment are stored, from the banknote handling unit 130, and mounts the cassette 170 to another banknote handling unit 130 of a money handling apparatus 30 which is a replenishment destination. In the banknote handling unit 130 as the replenishment destination, the banknotes for replenishment are fed out from the cassette 170. The fed out banknotes are recognized and counted by the recognition unit 150, and are stored in any of the storage units 171*a* to 171*c* according to recognition result including the denomination.

Replenishment of the money handling apparatus 30 with banknotes can also be performed by using the inlet 110 and the outlet 120. The money handling apparatus 30 as the replenishment source performs the dispensing process, whereby banknotes for replenishment are fed out from the storage units 171 and dispensed from the outlet 120. The cashier deposits the banknotes for replenishment, which has been dispensed from the money handling apparatus 30 as the replenishment source, into the inlet 110 of the money handling apparatus 30 as the replenishment destination. In the banknote handling unit 130 as the replenishment destination, the deposited banknotes are recognized and counted by the recognition unit 150, and are stored in any of the storage units 171*a* to 171*c* according to recognition result including the denomination.

The coin handling unit 230 shown in FIG. 4B performs a coin depositing process and a coin dispensing process. In the coin depositing process, coins are received in the inlet 210. The received coins are dropped into a feeding unit 280 of the unit 230. The coins are fed out one by one from the feeding unit 280 and are transported along a transport path by a depositing transport unit 260. A recognition unit 250 recognizes and counts the coins being transported. In an exemplary implementation, recognition unit 250 includes various sensors and circuits in order to perform a recognition process to recognize and count the coins. The recognition unit 250 recognizes, for example, denomination, authenticity, and fitness of each coin. The transport path located downstream of the recognition unit 250 is provided with a plurality of chutes 261. Each chute 261 is connected to any one of the outlet 220, a cassette 270, storage units 271*a* to 271*h*, and a collection unit 272. The chutes 261 are usually closed. One chute 261 is opened based on the recognition result of a coin, and this coin is dropped into the opened chute 261 and stored in any of the outlet 220, the cassette 270, the storage units 271*a* to 271*h*, and the collection unit 272. Coins that cannot be deposited are not dropped from the chutes 261 but are continued to be transported, and are returned as reject coins from the outlet 220. Coins that can be deposited are stored in any of the plurality of storage units 271*a* to 271*h* for each denomination. The collection unit 272 is used for storing coins that cannot be stored in the storage unit 271 because the storage unit 271 are full of coins, for example.

In the coin dispensing process, coins are fed out one by one from the storage units 271 (271*a* to 271*h*). A dispensing transport unit 262 disposed beneath the storage units 271 receives the coins fed out from the storage units 271, and transports the coins upward to the feeding unit 280. A bottom portion of the feeding unit 280 is opened, and the coins are dropped to the outlet 220 through the bottom portion. The dropped coins are discharged from the outlet 220. The denominations of coins to be stored in the respective storage units 271*a* to 271*h* can be set in advance. The money handling apparatus 30 manages the denomination and the number of coins being stored in each of the storage units 271*a* to 271*h*. This allows the money handling apparatus 30 to dispense a required number of coins of a required denomination from the outlet 220.

Replenishment of a money handling apparatus 30 with coins can be performed by using the cassette 270. The cassette 270 is mountable and dismountable with respect to the coin handling unit 230. A money handling apparatus 30, which is a replenishment source, feeds out coins for replenishment from the storage units 271 and stores the coins into the cassette 270. The cashier removes the cassette 270, in which the coins for replenishment are stored, from the coin handling unit 230, and mounts the cassette 270 to another coin handling unit 230 of a money handling apparatus 30 which is the replenishment destination. In the coin handling unit 230 as the replenishment destination, the coins for replenishment are fed out from the cassette 270. The fed out coins are recognized and counted by the recognition unit 250, and are stored in any of the storage units 271*a* to 271*h* according to recognition result including the denomination.

Replenishment of the money handling apparatus 30 with coins can also be performed by using the inlet 210 and the outlet 220. The money handling apparatus 30 as the replenishment source performs a dispensing process, whereby coins for replenishment are fed out from the storage units 271 and dispensed from the outlet 220. The cashier deposits the coins for replenishment, which has been dispensed from the money handling apparatus 30 as the replenishment source, into the inlet 210 of the money handling apparatus 30 as the replenishment destination. In the coin handling unit 230 as the replenishment destination, the deposited coins are recognized and counted, and are stored in any of the storage units 271*a* to 271*h* according to recognition result including the denomination.

As described above, in the money handling system 1, the banknote replenishment process can be performed by either the banknote moving method using the cassette 170 or the banknote moving method using the inlet 110 and the outlet 120. Meanwhile, the coin replenishment process can be performed by either the coin moving method using the cassette 270 or the coin moving method using the inlet 210 and the outlet 220.

In the money handling apparatus 30, a threshold for determining whether or not replenishment of money is necessary is set for each denomination of money stored in the storage units 171, 271. For example, when there is a denomination of which the quantity of money in the storage unit 171 (271) decreases and becomes equal to or less than the threshold, the money handling apparatus 30 performs a process of notifying the cashier that replenishment of money becomes necessary. Alternatively, for example, the management apparatus 10, which manages the inventory quantity of money in the money handling apparatus 30, detects that there is a denomination of which the quantity of money becomes equal to or less than the threshold, and performs the notification process in the money handling apparatus 30.

In the notification process, information on money for replenishment can be displayed on the display unit 34 of the cash register 100. For example, the display unit 34 displays information on the denomination of which the quantity of money has become equal to or less than the threshold, information on the quantity of money of this denomination currently stored in the storage unit 171 (271), and information instructing replenishment of money. The cashier checks the information displayed on the display unit 34 and determines the denomination and quantity of money for replenishing the money handling apparatus 30. The cashier can determine the denomination and quantity of money (change fund) for replenishment by operating the operation unit 33 of the cash register 100. The cashier can request the replenishment of change fund by operating the operation unit 33.

Figure 5:
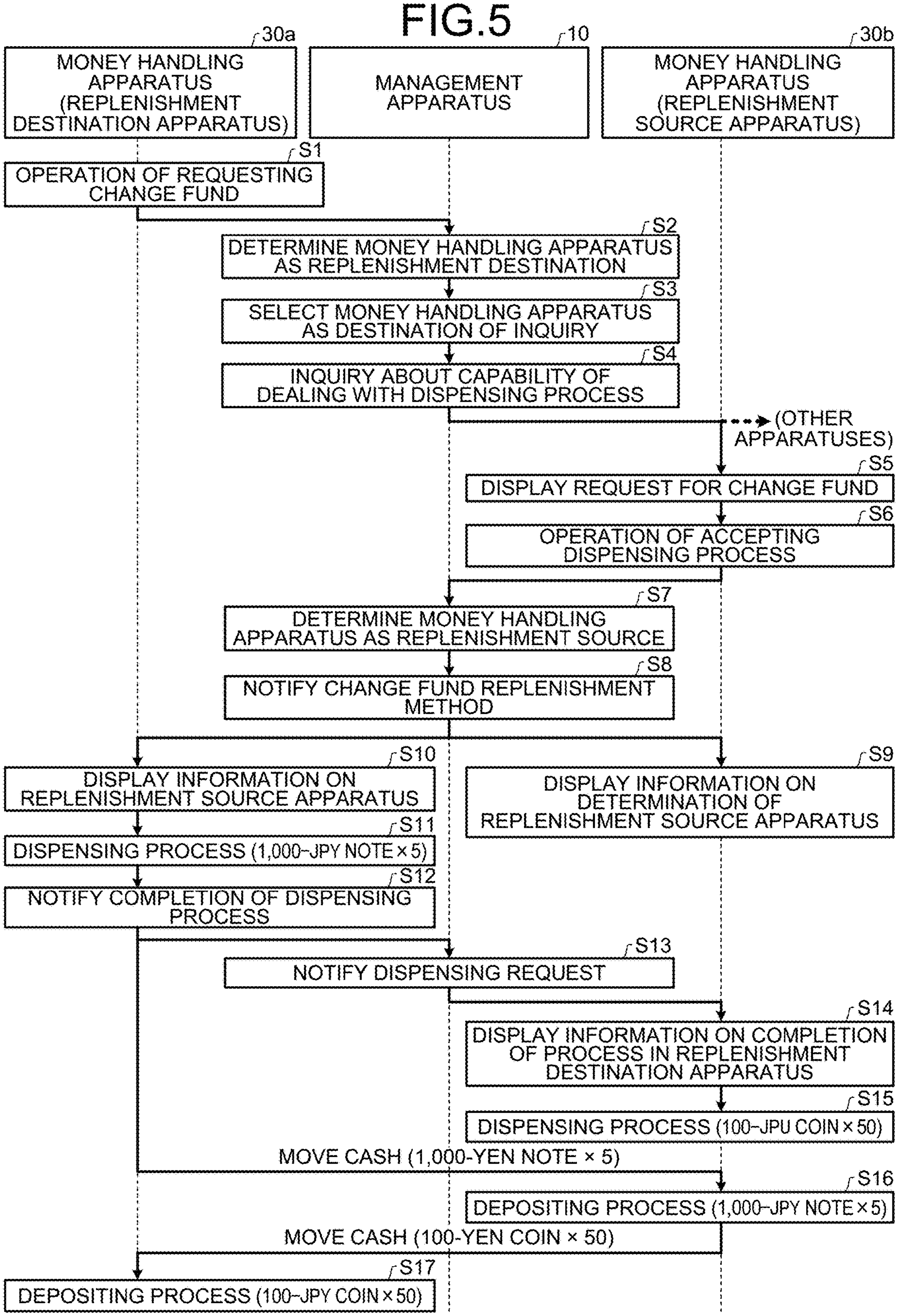
FIG. 5 is a timing chart illustrating a flow of a money replenishment process.

In the money handling apparatus 30, banknotes and coins are handled in similar manners. Hereinafter, the specific flow of the replenishment process of coins performed between the plurality of money handling apparatuses 30 will be described as an example. FIG. 5 is a timing chart showing the flow of the money replenishment process performed by control units 11 and 31 of management apparatus 10 and money handling apparatus 30.

As an example, the description will be continued assuming that the number of 100-JPY coins being stored in the money handling apparatus 30*a* became 98, that is, less than 100 which is a threshold set in advance for determining necessity of replenishment of 100-JPY coins. In this situation where replenishment of 100-JPY coins becomes necessary, information indicating that the number of 100-JPY coins currently stored in the money handling apparatus 30*a* is 98 and information indicating that replenishment of 100-JPY coins is necessary, are displayed on the display unit 34 of the cash register 100. The information displayed on the display unit 34 allows the cashier to confirm that ninety-eight 100-JPY coins can be dispensed from the money handling apparatus 30*a* from now on. If the cashier needs to serve customers waiting in line, the cashier can continue the depositing/dispensing process regarding item transaction with the customers. While the cashier continues the item transactions, if some 100-JPY coins are dispensed and the number of 100-JPY coins decreases, the number of 100-JPY coins, which can be dispensed, displayed on the display unit 34 is also updated to the number after the dispensing. For example, if three 100-JPY coins are dispensed, the number of 100-JPY coins displayed on the display unit 34 is updated from 98 to 95.

For example, the operation unit 33 of the cash register 100 is provided with a change request button for requesting a change fund replenishment process. When the cashier has finished serving the customers and decided to start the replenishment process, the cashier presses the change request button provided to the operation unit 33. Then, the number of 100-JPY coins currently stored in the money handling apparatus 30*a* and information requesting input of the number of 100-JPY coins for replenishment, are displayed on the display unit 34.

For example, the cashier inputs "50" as the number of 100-JPY coins for replenishment. By this operation, the denomination and the number of coins as change fund (money for replenishment) are determined. After the determination of the denomination and the number of coins as change fund with which the money handling apparatus 30*a* is replenished, the money handling apparatus 30*a* transmits, to the management apparatus 10, information requesting fifty 100-JPY coins as change fund (money for replenishment) (step S1).

Upon receiving the information from the money handling apparatus 30*a*, the management apparatus 10 determines the money handling apparatus 30*a* as a replenishment destination apparatus (step S2). The management apparatus 10 selects money handling apparatuses to be candidates for a replenishment source apparatus (step S3), and makes an inquiry to the candidate apparatuses about whether or not the candidate apparatuses can perform dispensing of money for replenishment (step S4).

The method for selecting money handling apparatuses 30 to be candidates for a replenishment source apparatus can be changed by setting. For example, the management apparatus 10 can make the inquiry to all the money handling apparatuses 30*b* to 30*d*, which are present at the same checkout counter 3 as the money handling apparatus 30*a*, except this replenishment destination apparatus 30*a*.

Alternatively, for example, the management apparatus 10 may select money handling apparatuses 30 to be candidates for a replenishment source apparatus, based on inventory information of each of the money handling apparatuses 30*b* to 30*d*, and may make the inquiry to the selected money handling apparatuses 30. For example, the management apparatus 10 refers to inventory information of each money handling apparatuses 30, and selects, as a candidate for a replenishment source apparatus, a money handling apparatus 30 in which the number of 100-JPY coins will not become equal to or less than 100, which is the threshold for determining necessity of replenishment of 100-JPY coins, even after fifty 100-JPY coins (money for replenishment) are dispensed therefrom.

Replenishment of change fund is performed by exchanging money (money for exchange) dispensed from the replenishment destination apparatus, for the change fund (money for replenishment) dispensed from the replenishment source apparatus. The money to be dispensed from the replenishment destination apparatus for exchange is equal in amount to the change fund and is different in denomination from the change fund. Therefore, the management apparatus 10 selects, as a candidate for the replenishment source apparatus, a money handling apparatus 30 capable of storing therein the money for exchange.

The denomination and quantity of money for exchange are manually or automatically selected. For example, when the cashier of the replenishment destination apparatus designates "fifty 100-JPY coins" as change fund in step S1, the cashier can designate "five 1,000-JPY notes" as money for exchange. For each money handling apparatus 30, a collection threshold for determining whether or not collection of money from the storage unit 171 (271) is necessary is set in advance. When money for exchange is designated to be five 1000-JPY notes, the management apparatus 10 selects, as a candidate for the replenishment source apparatus, a money handling apparatus 30 in which the number of 1,000-JPY notes stored therein will not exceed the threshold for determining necessity of collection of 1000-JPY notes even when additional five 1,000-JPY notes are stored therein.

If money for exchange is not designated in step S1, the management apparatus 10 can automatically selects money for exchange. Specifically, the management apparatus 10 can select money for exchange such that the quantity of stored money will not become equal to or less than the threshold for determining necessity of replenishment even after dispensing the money for exchange from the replenishment destination apparatus, and the quantity of stored money will not exceed the threshold for determining necessity of collection even after depositing the money for exchange into the replenishment source apparatus. For example, when fifty 100-JPY coins are designated as change fund for replenishing the money handling apparatus 30*a*, the management apparatus 10 refers to inventory information of each money handling apparatus 30 and automatically sets money for exchange such as one 5,000-JPY note or five 1,000-JPY notes. Hereinafter, the description will be continued with the money for exchange being set to five 1,000-JPY notes. After the change fund and the money for exchange have been determined, and the management apparatus 10 selects, as candidates for a replenishment source apparatus, money handling apparatuses 30 from which the change fund can be dispensed and into which the money for exchange can be deposited, the management apparatus 10 makes an inquiry to the selected candidate apparatuses 30.

As shown by a broken-line arrow between step S4 and step S5 in FIG. 5, the inquiry from the management apparatus 10 may be made to a plurality of money handling apparatuses 30 including the money handling apparatus 30*b* shown in FIG. 5. The management apparatus 10 waits until receiving replies from the money handling apparatuses 30 to which the inquiry was transmitted.

In each money handling apparatus 30 having received the inquiry from the management apparatus 10, information indicating that a change fund dispensing process has been requested, is displayed on the display unit 34 of the cash register 100 (step S5). On the display unit 34, information indicating the register number of the money handling apparatus 30*a* requiring replenishment, information indicating "fifty 100-JPY coins" as change fund for replenishing the money handling apparatus 30*a*, and information indicating "five 1,000-JPY notes" as money for exchange to be deposited in exchange for the change fund, are displayed. In addition, information requesting a reply about whether or not the cashier can deal with the change fund dispensing process is displayed on the display unit 34. Furthermore, information indicating the number of 100-JPY coins, which will remain in the apparatus 30 if the cashier accepts the request for the dispensing process and fifty 100-JPY coins are dispensed from the apparatus 30, is displayed on the display unit 34.

The cashier of the money handling apparatus 30 having received the inquiry checks the information displayed on the display unit 34 and decides whether or not to accept the request for the change fund dispensing process. The cashier, having decided to accept the request for the dispensing process, performs an operation for accepting the change fund dispensing process by using the operation unit 33 of the cash register 100 (step S6). The money handling apparatus 30*b* transmits, to the management apparatus 10, a reply of accepting the request for the change fund dispensing process.

The management apparatus 10 determines a money handling apparatus to be a change-fund replenishment source after waiting for a reply of accepting the request for the dispensing process from any of the money handling apparatuses 30 (step S7). The method for determining a replenishment source apparatus can be changed by setting. For example, a money handling apparatus that has firstly performed an operation for accepting the request for the dispensing process may be determined as a replenishment source apparatus.

Alternatively, for example, a replenishment source apparatus may be determined from among money handling apparatuses that have performed the operation for accepting the request for the dispensing process within a predetermined time. For example, the management apparatus 10 determines a replenishment source apparatus after the predetermined time has elapsed after the inquiry in step 4. It is assumed that the operation for accepting the dispensing process has been performed in a plurality of money handling apparatuses 30 including the money handling apparatus 30*b* before the predetermined time elapses after the inquiry in step S4. In this case, the management apparatus 10 determines a replenishment source apparatus, based on inventory information of each money handling apparatus 30 having accepted the request for the dispensing process. For example, the management apparatus 10 determines, as a replenishment source apparatus, a money handling apparatus 30 that stores the largest number of 100-JPY coins.

The management apparatus 10 can divide the quantity of change fund into a plurality of smaller quantities of money and determine a plurality of money handling apparatuses 30 as replenishment source apparatuses. For example, when there are two money handling apparatuses 30 each storing the largest number of 100-JPY coins (i.e., when the two apparatuses 30 store the same number of 100-JPY coins), the management apparatus 10 divides the fifty 100-JPY coins as change fund into two, i.e., twenty-five 100-JPY coins, and determines the two apparatuses 30 as replenishment source apparatuses.

If a money handling apparatus 30 capable of dispensing fifty 100-JPY coins is not found in step S3 or a reply of accepting the request for the dispensing process is not received even when the predetermined time has elapsed after the inquiry in step S4, the management apparatus 10 suspends the replenishment process. In this case, the management apparatus 10 notifies the money handling apparatus 30*a*, which has requested replenishment of change fund, to dispense fifty 100-JPY coins from the money handling apparatus 20 of the back office 2. The content of the notification from the management apparatus 10 is displayed on the display unit 34 of the cash register 100 of the money handling apparatus 30*a* having received the notification. The cashier checks information displayed on the display unit 34, and dispenses fifty 100-JPY coins from the money handling apparatus 20 in the back office 2 to replenish the money handling apparatus 30*a* with the dispensed coins.

The description will be continued with the money handling apparatus 30*b* having been determined as a replenishment source apparatus in step S7. The management apparatus 10, having determined the replenishment source apparatus, notifies the money handling apparatus 30*b*, which is a change-fund replenishment source, and the money handling apparatus 30*a*, which is a change-fund replenishment destination, of a change fund replenishing method (step S8).

In the money handling apparatus 30*b*, information indicating that the apparatus 30*b* has been determined as a replenishment source apparatus is displayed on the display unit 34 of the cash register 100 (step S9). In addition, the register number of the money handling apparatus 30*a* as the replenishment destination apparatus and information instructing dispensing of fifty 100-JPY coins as change fund, are displayed on the display unit 34. The cashier of the money handling apparatus 30*b* will dispense fifty 100-JPY coins, as change fund, from the money handling apparatus 30*b* and keep the dispensed change fund until the cashier of the money handling apparatus 30*a* comes to receive the dispensed change fund.

In the money handling apparatus 30*a*, information indicating the register number of the money handling apparatus 30*b* determined as the replenishment source apparatus is displayed on the display unit 34 of the cash register 100 (step S10). Information instructing to dispense five 1,000-JPY notes, which has been set as money for exchange, from the money handling apparatus 30*a* is displayed on the display unit 34. Information instructing to go to receive fifty 100-JPY coins as the change fund dispensed from the money handling apparatus 30*b* determined as the replenishment source is displayed on the display unit 34. The cashier of the money handling apparatus 30*a* checks the information displayed on the display unit 34, and performs a process of dispensing five 1,000-JPY notes from the money handling apparatus 30*a* (step S11).

When the cashier has performed the process of dispensing five 1,000-JPY notes as money for exchange to be exchanged for fifty 100-JPY coins as change fund, the money handling apparatus 30*a* transmits, to the management apparatus 10, a notification that the process of dispensing the money for exchange has been completed (step S12). The management apparatus 10 transmits a notification requesting the money handling apparatus 30*b* as the replenishment source apparatus to perform the process of dispensing fifty 100-JPY coins as change fund (step S13).

In the money handling apparatus 30*b*, information indicating the register number of the money handling apparatus 30*a* as the replenishment destination apparatus and information indicating that the cashier of the money handling apparatus 30*a* will come soon to receive the change fund, are displayed on the display unit 34 of the cash register 100 (step S14). Additionally, if fifty 100-JPY coins as change fund have not yet been dispensed from the money handling apparatus 30*b*, information instructing to perform the dispensing of the change fund is displayed on the display unit 34.

The cashier of the money handling apparatus 30*b* performs a process of dispensing fifty 100-JPY coins as change fund from the money handling apparatus 30*b* (step S15). If the cashier has already dispensed and kept the dispensed change fund, the cashier makes preparation for giving the change fund to the cashier of the money handling apparatus 30*a*.

The cashier of the money handling apparatus 30*a* goes to the place where the money handling apparatus 30*b* is installed while carrying five 1,000-JPY notes as money for exchange dispensed from the money handling apparatus 30*a*. The cashier of the money handling apparatus 30*a* passes the five 1,000-JPY notes as money for exchange to the cashier of the money handling apparatus 30*b*. The cashier of the money handling apparatus 30*b* passes the fifty 100-JPY coins, which has been dispensed from the money handling apparatus 30*b* as change fund for the money handling apparatus 30*a*, to the cashier of the money handling apparatus 30*a* in exchange for the received five 1,000-JPY notes.

The cashier of the money handling apparatus 30*b* performs a process of depositing the five 1,000-JPY notes as money for exchange into the money handling apparatus 30*b* (step S16). The cashier of the money handling apparatus 30*a* returns to the place where the money handling apparatus 30*a* is installed and performs a process of depositing the fifty 100-JPY coins as change fund into the money handling apparatus 30*a* (step S17). Thus, the process of replenishing the money handling apparatus 30*a* with the fifty 100-JPY coins as change fund is finished.

The management apparatus 10 managing inventory information of each money handling apparatus 30 updates inventory information of the money handling apparatuses 30*a* and 30*b*, based on the contents of the dispensing processes in steps S11 and S15 and on the contents of the depositing processes in steps S16 and S17.

The dispensing processes in steps S11 and S15 and the depositing processes in steps S16 and S17 may be performed using the inlets 110, 210 and the outlets 120, 220 of the money handling apparatuses 30 or using the cassettes 170, 270 as described above. The order of the dispensing process in step S15 and the depositing process in step S16 is not particularly limited, and may be reversed. Specifically, in the money handling apparatus 30*b*, the change fund dispensing process may be performed after the money-for-exchange depositing process.

As described above, the fifty 100-JPY coins dispensed from the money handling apparatus 30*b* are exchanged for the five 1,000-JPY notes dispensed from the money handling apparatus 30*a*, whereby replenishment of change fund can be performed without changing the inventory amount (total amount) of money stored in each apparatus 30*a* and 30*b*. However, the change fund replenishment method is not limited thereto. Only the fifty 100-JPY coins as change fund may be moved from the apparatus 30*b* to the apparatus 30*a*. In this case, the processes in steps S11 to S14 and the process in step S16 shown in FIG. 5 are not performed. After notification of the change fund replenishment method in steps S9 and S10, fifty 100-JPY coins as change fund are dispensed from the money handling apparatus 30*b* as the replenishment source in step S15, and the money handling apparatus 30*a* as the replenishment destination is replenished with the dispensed coins for replenishment in step S17. In this case, the management apparatus 10 updates inventory information of the money handling apparatuses 30*a*, 30*b*, based on the content of the dispensing process in step S15 and the content of the depositing process in step S17.

In the present embodiment, a plurality of money handling apparatuses 30 can be determined as replenishment source apparatuses when the management apparatus 10 determines a replenishment source apparatus. However, a plurality of replenishment source apparatuses may be set when the management apparatus 10 makes an inquiry about capability of dealing with the dispensing process.

For example, if a money handling apparatus 30 capable of dispensing fifty 100-JPY coins as change fund cannot be found in step S3 shown in FIG. 5, the management apparatus 10 divides the number of coins (i.e., 50) as change fund into two (i.e., 25). Then, the management apparatus 10 makes an inquiry to money handling apparatuses 30 capable of dispensing twenty-five 100-JPY coins about whether or not the apparatuses 30 can perform the dispensing process. The management apparatus 10 determines two money handling apparatuses 30, which have accepted the request for the dispensing process, as replenishment source apparatuses. The determination result is notified to the two money handling apparatuses 30 as the replenishment sources and the money handling apparatus 30 as the replenishment destination. If the change fund is to be received in exchange for money for exchange, the management apparatus 10 notifies the money handling apparatus 30 as the replenishment destination of information instructing preparation of two sets of 2,500-JPY as money for exchange. Each set of 2,500-JPY is deposited to each of the two money handling apparatuses 30 as the replenishment sources. Thus, twenty-five 100-JPY coins are dispensed from each of the two money handling apparatuses 30 as the replenishment sources, and the money handling apparatus 30 as the replenishment destination is replenished with these fifty 100-JPY coins as change fund.

In the present embodiment, the entire change fund requested by the replenishment destination apparatus is dispensed from the replenishment source apparatus. However, only part of the requested change fund may be dispensed from the replenishment source apparatus. Specifically, when the replenishment destination apparatus has requested fifty 100-JPY coins as change fund as described above, the replenishment destination apparatus may be replenished with less than fifty 100-JPY coins.

For example, if there is no money handling apparatus 30 capable of dispensing fifty 100-JPY coins in step S3 shown in FIG. 5, the management apparatus 10 decreases the number of 100-JPY coins by a predetermined percentage, and makes an inquiry to money handling apparatuses 30 capable of dispensing the decreased number of 100-JPY coins whether or not the apparatuses 30 can perform the dispensing process. For example, based on settings prepared in advance, the management apparatus 10 may decrease the number of coins by 10 (a predetermined number) to make it 40, or may decrease the number of coins to 90% (a predetermined percentage) to make it 45. Thus, the replenishment destination apparatus can be replenished with at least a part of the requested change fund.

Figure 6:
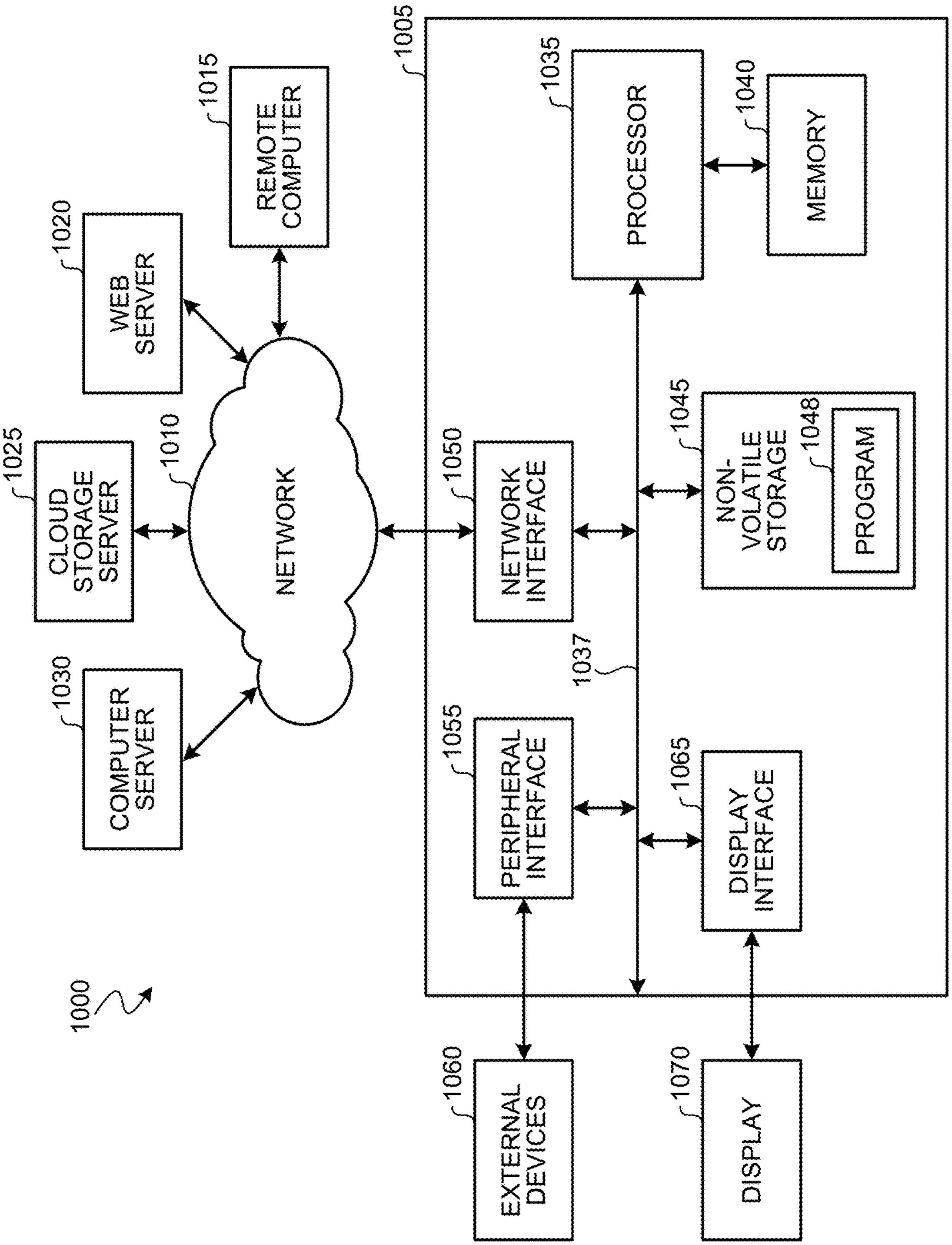
FIG. 6 is a block diagram of computer-based circuitry that may be used to implement control features of the present disclosure.

FIG. 6 illustrates a block diagram of a computer that may implement the various embodiments described herein. The present disclosure may be embodied as a system, a method, and/or a computer program product. The computer program product may include a non-transitory computer readable storage medium on which computer readable program instructions are recorded that may cause one or more processors to carry out aspects of the embodiment. For example, management apparatus 10, control unit 11, money handling apparatuses 20 and 30, control unit 31, banknote handling unit 130, coin handling unit 230 and their individual components as well as attached components may be configured to include various elements depicted in FIG. 6.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 6 is a functional block diagram illustrating a networked system 1000 of one or more networked computers and servers. In an embodiment, the hardware and software environment illustrated in FIG. 6 may provide an exemplary platform for implementation of the software and/or methods according to the present disclosure.

Referring to FIG. 6, a networked system 1000 may include, but is not limited to, computer 1005, network 1010, remote computer 1015, web server 1020, cloud storage server 1025 and compute server 1030. In some embodiments, multiple instances of one or more of the functional blocks illustrated in FIG. 6 may be employed.

Additional detail of computer 1005 is shown in FIG. 6. The functional blocks illustrated within computer 1005 are provided only to establish exemplary functionality and are not intended to be exhaustive. And while details are not provided for remote computer 1015, web server 1020, cloud storage server 1025 and compute server 1030, these other computers and devices may include similar functionality to that shown for computer 1005.

Computer 1005 may be a personal computer (PC), a desktop computer, laptop computer, tablet computer, netbook computer, a personal digital assistant (PDA), a smart phone, or any other programmable electronic device capable of communicating with other devices on network 1010.

Computer 1005 may include processor 1035, bus 1037, memory 1040, non-volatile storage 1045, network interface 1050, peripheral interface 1055 and display interface 1065. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 1035 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 1037 may be a proprietary or industry standard high-speed parallel or serial peripheral interconnect bus, such as ISA, PCI, PCI Express (PCI-e), AGP, and the like.

Memory 1040 and non-volatile storage 1045 may be computer-readable storage media. Memory 1040 may include any suitable volatile storage devices such as Dynamic Random Access Memory (DRAM) and Static Random Access Memory (SRAM). Non-volatile storage 1045 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 1048 may be a collection of machine readable instructions and/or data that is stored in non-volatile storage 1045 and is used to create, manage and control certain software functions that are discussed in detail elsewhere in the present disclosure and illustrated in the drawings. In some embodiments, memory 1040 may be considerably faster than non-volatile storage 1045. In such embodiments, program 1048 may be transferred from non-volatile storage 1045 to memory 1040 prior to execution by processor 1035.

Computer 1005 may be capable of communicating and interacting with other computers via network 1010 through network interface 1050. Network 1010 may be, for example, a local area network (LAN), a wide area network (WAN) such as the Internet, or a combination of the two, and may include wired, wireless, or fiber optic connections. In general, network 1010 can be any combination of connections and protocols that support communications between two or more computers and related devices.

Peripheral interface 1055 may allow for input and output of data with other devices that may be connected locally with computer 1005. For example, peripheral interface 1055 may provide a connection to external devices 1060. External devices 1060 may include devices such as a keyboard, a mouse, a keypad, a touch screen, and/or other suitable input devices. External devices 1060 may also include portable computer-readable storage media such as, for example, thumb drives, portable optical or magnetic disks, and memory cards. Software and data used to practice embodiments of the present disclosure, for example, program 1048, may be stored on such portable computer-readable storage media. In such embodiments, software may be loaded onto non-volatile storage 1045 or, alternatively, directly into memory 1040 via peripheral interface 1055. Peripheral interface 1055 may use an industry standard connection, such as RS-232 or Universal Serial Bus (USB), to connect with external devices 1060.

Display interface 1065 may connect computer 1005 to display 1070. Display 1070 may be used, in some embodiments, to present a command line or graphical user interface to a user of computer 1005. Display interface 1065 may connect to display 1070 using one or more proprietary or industry standard connections, such as VGA, DVI, DisplayPort and HDMI.

As described above, network interface 1050, provides for communications with other computing and storage systems or devices external to computer 1005. Software programs and data discussed herein may be downloaded from, for example, remote computer 1015, web server 1020, cloud storage server 1025 and compute server 1030 to non-volatile storage 1045 through network interface 1050 and network 1010. Furthermore, the systems and methods described in this disclosure may be executed by one or more computers connected to computer 1005 through network interface 1050 and network 1010. For example, in some embodiments the systems and methods described in this disclosure may be executed by remote computer 1015, computer server 1030, or a combination of the interconnected computers on network 1010.

Data, datasets and/or databases employed in embodiments of the systems and methods described in this disclosure may be stored and or downloaded from remote computer 1015, web server 1020, cloud storage server 1025 and compute server 1030.

In an exemplary embodiment, a money handling system is used for performing the replenishment process in which money for replenishment is dispensed from a replenishment-source apparatus and a replenishment-destination apparatus is replenished with the money for replenishment. The system includes: a plurality of money handling apparatuses each including an operation unit and performing a money depositing process and/or a money dispensing process; and a management apparatus communicably connected to the respective money handling apparatuses. The management apparatus is configured to detect a money handling apparatus, in which an operation for requesting replenishment of money has been performed on the operation unit, as a replenishment-destination apparatus, make an inquiry to other money handling apparatuses about whether or not a process of dispensing the money for replenishment is able to be performed, determine a money handling apparatus, in which an operation for accepting the dispensing process has been performed on the operation unit, as a replenishment-source apparatus and notify the replenishment-source apparatus and the replenishment-destination apparatus of information on determination result of the replenishment-source apparatus.

In the above configuration, the plurality of money handling apparatuses are installed in the same area of a store, where customers are served.

In the above configuration, each of the money handling apparatuses has a display unit. When the management apparatus makes the inquiry about whether or not the process of dispensing the money for replenishment is able to be performed, information on the money for replenishment is displayed on the display unit of each money handling apparatus having received the inquiry. When the management apparatus notifies the information on determination of the replenishment-source apparatus, information on the replenishment-source apparatus is displayed on the display units of the replenishment-source apparatus and the replenishment-destination apparatus.

In the above configuration, when the operation for accepting the process of dispensing the money for replenishment has been performed in a plurality of money handling apparatuses to which the inquiry was made, the management apparatus is configured to determine a replenishment-source apparatus, based on inventory quantities of money in the respective money handling apparatuses in which the accepting operation has been performed.

In the above configuration, when the operation for accepting the process of dispensing the money for replenishment has been performed in a plurality of money handling apparatuses to which the inquiry was made, the management apparatus is configured to determine a plurality of money handling apparatuses as replenishment-source apparatuses such that a total of quantities of money to be dispensed from the respective money handling apparatuses is equal to the quantity of the money for replenishment.

In the above configuration, the management apparatus is configured to select a money handling apparatus capable of dispensing the money for replenishment, based on inventory quantities of money in the respective money handling apparatuses, and makes the inquiry to an operator of the selected money handling apparatus about whether or not the operator can deal with the process of dispensing the money for replenishment.

In the above configuration, when there is no money handling apparatus capable of dispensing the money for replenishment, the management apparatus is configured to divide the quantity of the money for replenishment into a plurality of smaller quantities of money, select money handling apparatuses each capable of dispensing the smaller quantity of money after the division, make the inquiry to the selected money handling apparatuses, and determine a plurality of money handling apparatuses as replenishment-source apparatuses such that a total of the quantities of money to be dispensed from the respective money handling apparatuses is equal to the quantity of the money for replenishment.

In the above configuration, the replenishment-destination apparatus is configured to dispense money for exchange which is equal in amount to the money for replenishment and is different in denomination from the money for replenishment, and the replenishment-source apparatus is configured to perform dispensing of the money for replenishment and depositing of the money for exchange.

In another exemplary embodiment, a management apparatus is configured to determine a replenishment-source apparatus and a replenishment-destination apparatus from among a plurality of money handling apparatuses each having an operation unit, in order to dispense money for replenishment from the replenishment-source apparatus and replenish the replenishment-destination apparatus with the money for replenishment. The management apparatus includes: a communication unit configured to communicate with the respective money handling apparatuses; and a control unit. The control unit is configured to detect a money handling apparatus, in which an operation for requesting replenishment of money has been performed on the operation unit, as a replenishment-destination apparatus, make an inquiry to other money handling apparatuses about whether or not a process of dispensing the money for replenishment is able to be performed, determine a money handling apparatus, in which an operation for accepting the dispensing process has been performed on the operation unit, as a replenishment-source apparatus, and notify the replenishment-source apparatus and the replenishment-destination apparatus of information on determination result of the replenishment-source apparatus.

According to the present embodiment, a replenishment-source apparatus and a replenishment-destination apparatus are determined based on operations performed by operators of the respective money handling apparatus. Therefore, a money replenishment process can be efficiently performed between these money handling apparatuses while avoiding a situation that the operators cannot deal with the replenishment process.

As described above, in the money handling system, after necessity of replenishing a money handling apparatus with money has occurred, an operator of this money handling apparatus 30 can determine a timing to request replenishment of money from another money handling apparatus, by operating the operation unit. An operator of the money handling apparatus requested to dispense the money for replenishment can select whether or not to accept the request for the dispensing of money, by operating the operation unit. Thus, it is possible to efficiently perform a money replenishment process between a plurality of money handling apparatuses.

As described above, the management apparatus and the money handling system according to the present disclosure are useful for efficiently performing a money replenishment process between a plurality of money handling apparatuses constituting the money handling system.

What is claimed is:

1. A money handling system for dispensing money, the money handling system comprising:

a plurality of money handling apparatuses, each including an operation input device for receiving an input operation from an operator and performing a money depositing process and/or a money dispensing process; and a management apparatus communicably connected to the plurality of money handling apparatuses, the management apparatus including circuitry configured to determine a first money handling apparatus, in which an operation for requesting replenishment of money has been performed on the operation input device, as a replenishment-destination apparatus;

inquire, to other money handling apparatuses of the plurality of money handling apparatuses, about whether or not money is available for dispensing via a replenishment process;

determine a second money handling apparatus, in which an operation for accepting the replenishment process has been performed on the operation input device of the second money handling apparatus, as a replenishment-source apparatus; and notify the first money handling apparatus and the second money handling apparatus that the management apparatus has determined the second money handling apparatus as the replenishment-source apparatus.

2. The money handling system according to claim 1, wherein the plurality of money handling apparatuses are installed in a same area of a store, where customers are served.

3. The money handling system according to claim 1, wherein each of the money handling apparatuses further includes a display, in a case that the management apparatus inquires about whether or not the money is available for dispensing via the replenishment process, first information of the money for replenishment is displayed on the display of each money handling apparatus having received the inquiry, and in a case that the management apparatus performs a notification on the apparatus of acceptance, second information of the replenishment-source apparatus is displayed on the display of the replenishment-source apparatus and the replenishment-destination apparatus.

4. The money handling system according to claim 1, wherein in a case that the operation for accepting the replenishment process has been performed in plural money handling apparatuses having received the inquiry, the circuitry of the management apparatus is configured to determine which money handling apparatus of the plural money handling apparatus to identify as the replenishment-source apparatus based on inventory quantities of money in the respective plural money handling apparatuses.

5. The money handling system according to claim 1, wherein in a case that the operation for accepting the replenishment process has been performed in plural money handling apparatuses having received the inquiry, the circuitry of the management apparatus is configured to determine that the plural money handling apparatuses are to be replenishment-source apparatuses such that a total of quantities of money to be dispensed from the respective plural money handling apparatuses is equal to the quantity of the money for replenishment.

6. The money handling system according to claim 1, wherein the circuitry of the management apparatus is further configured to select a money handling apparatus capable of dispensing the money for replenishment, based on inventory quantities of money in the respective money handling apparatuses, and inquire, to the selected money handling apparatus, about whether or not the operator can deal with the process of dispensing the money for replenishment.

7. The money handling system according to claim 6, wherein in a case that there is no money handling apparatus capable of dispensing the money for replenishment, the circuitry of the management apparatus is configured to divide the quantity of the money for replenishment into a plurality of smaller quantities of money, select money handling apparatuses each capable of dispensing the smaller quantity of money after the division, inquire to the selected money handling apparatuses about whether or not the smaller quantity of money is available for dispensing via the replenishment process, and determine a plurality of money handling apparatuses as replenishment-source apparatuses such that a total of the quantities of money to be dispensed from the respective money handling apparatuses is equal to the quantity of the money for replenishment.

8. The money handling system according to claim 1, wherein the replenishment-destination apparatus is configured to dispense money for exchange which is equal in amount to the money for replenishment and is different in denomination from the money for replenishment, and the replenishment-source apparatus is configured to performs dispensing of the money for replenishment and depositing of the money for exchange.

9. The money handling system according to claim 1, wherein the circuitry of the management apparatus is further configured to notify, in response to completion of a dispensing process for the replenishment process by the first money handling apparatus, the second money handling apparatus to perform a dispensing process.

10. The money handling system according to claim 9, wherein the circuitry of the management apparatus is further configured to notify the second handling apparatus to perform the dispensing process with an amount of money corresponding to the amount of money dispensed by the first money handling apparatus.

11. A management apparatus that communicates with a plurality of money handling apparatuses, each including an operation input device for receiving an input operation from an operator, the management apparatus comprising:

a transceiver configured to communicate with the plurality of money handling apparatuses; and a control circuit configured to determine a first money handling apparatus, in which an operation for requesting replenishment of money has been performed on the operation input device, as a replenishment-destination apparatus;

inquire, to other money handling apparatuses of the plurality of money handling apparatuses, about whether or not money is available for dispensing via a replenishment process;

determine a second money handling apparatus, in which an operation for accepting the replenishment process has been performed on the operation input device of the second money handing apparatus, as a replenishment-source apparatus; and notify the first money handling apparatus and the second money handling apparatus that the management apparatus has determined the second money handling apparatus as the replenishment-source apparatus.

12. The management apparatus according to claim 11, wherein the plurality of money handling apparatuses are installed in a same area of a store, where customers are served.

13. The management apparatus according to claim 11, wherein each of the money handling apparatuses further includes a display, in a case that the control circuit inquires about whether or not the money is available for dispensing via the replenishment process, first information of the money for replenishment is displayed on the display of each money handling apparatus having received the inquiry, and in a case that the control circuit performs a notification on the replenishment-source apparatus, second information of the replenishment-source apparatus is displayed on the display of the replenishment-source apparatus and the replenishment-destination apparatus.

14. The management apparatus according to claim 11, wherein in a case that the operation for accepting the replenishment process has been performed in plural money handling apparatuses having received the inquiry, the control circuit is configured to determine which money handling apparatus of the plural money handling apparatus to identify as the replenishment-source apparatus based on inventory quantities of money in the respective plural money handling apparatuses.

15. The management apparatus according to claim 11, wherein in a case that the operation for accepting the replenishment process has been performed in plural money handling apparatuses having received the inquiry, the control circuit is configured to determine that the plural money handling apparatuses are to be replenishment-source apparatuses such that a total of quantities of money to be dispensed from the respective plural money handling apparatuses is equal to the quantity of the money for replenishment.

16. The management apparatus according to claim 11, wherein the control circuit is further configured to select a money handling apparatus capable of dispensing the money for replenishment, based on inventory quantities of money in the respective money handling apparatuses, and inquire, to the selected money handling apparatus, about whether or not the operator can deal with the process of dispensing the money for replenishment.

17. The management apparatus according to claim 16, wherein in a case that there is no money handling apparatus capable of dispensing the money for replenishment, the control circuit is configured to divide the quantity of the money for replenishment into a plurality of smaller quantities of money, select money handling apparatuses each capable of dispensing the smaller quantity of money after the division, inquire to the selected money handling apparatuses about whether or not the smaller quantity of money is available for dispensing via the replenishment process, and determine a plurality of money handling apparatuses as replenishment-source apparatuses such that a total of the quantities of money to be dispensed from the respective money handling apparatuses is equal to the quantity of the money for replenishment.

18. The management apparatus according to claim 11, wherein the replenishment-destination apparatus is configured to dispense money for exchange which is equal in amount to the money for replenishment and is different in denomination from the money for replenishment, and the replenishment-source apparatus is configured to performs dispensing of the money for replenishment and depositing of the money for exchange.

19. A money handling apparatus, comprising:

a transceiver configured to communicate with a management apparatus;

an operation input device for receiving an input from an operator of the money handling apparatus;

a display; and a control circuit configured to in a case that the operation input device receives an input operation for requesting replenishment of money:

control the transceiver to transmit a request for money replenishment to the management apparatus; and receive a notification, from the management apparatus via the transceiver, indicating that the management apparatus has determined another money handling apparatus as a replenishment-source apparatus for a replenishment process to replenish money of the money handling apparatus; and in a case that the transceiver receives an inquire from the management apparatus about whether or not money is available for dispensing via a replenishment process to another money handling apparatus:

control the display to display information indicating the inquiry regarding the replenishment process; and control the transceiver to transmit a result input via the operation input device as to whether or not the money is available for dispensing.

* * * * *